(12) United States Patent
Montes

(10) Patent No.: US 9,410,613 B2
(45) Date of Patent: Aug. 9, 2016

(54) ON-SCREEN GEAR SELECTOR FOR AUTOMATIC TRANSMISSION

(71) Applicant: Continental Automotive Systems, Inc., Auburn Hills, MI (US)

(72) Inventor: Carlos Montes, McHentry, IL (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 389 days.

(21) Appl. No.: 13/686,397

(22) Filed: Nov. 27, 2012

(65) Prior Publication Data

US 2014/0149909 A1     May 29, 2014

(51) Int. Cl.
F16H 59/08     (2006.01)
B60K 20/08     (2006.01)
B60K 35/00     (2006.01)
G06F 3/048     (2013.01)

(52) U.S. Cl.
CPC .............. *F16H 59/08* (2013.01); *B60K 20/08* (2013.01); *B60K 35/00* (2013.01); *B60K 2350/1032* (2013.01)

(58) Field of Classification Search
CPC ............................... G06F 3/0481; F16H 59/10
USPC .......................................................... 715/771
See application file for complete search history.

(56) References Cited

U.S. PATENT DOCUMENTS

| | | | |
|---|---|---|---|
| 4,790,204 A * | 12/1988 | Tury | F16H 59/12 73/866.1 |
| 4,905,530 A | 3/1990 | Stehle et al. | |
| 5,094,115 A | 3/1992 | Michihira et al. | |
| 5,884,528 A | 3/1999 | Ludanek et al. | |
| 6,487,484 B1 * | 11/2002 | Shober | F16H 59/12 477/125 |
| 7,847,680 B2 * | 12/2010 | Gencyuz et al. | 340/456 |
| 9,008,856 B2 * | 4/2015 | Ricci | G06F 9/54 455/404.1 |
| 9,021,911 B2 * | 5/2015 | Kim | F16H 59/105 747/473.12 |
| 2007/0176797 A1 * | 8/2007 | Rhodes | B60K 35/00 340/995.15 |
| 2009/0146798 A1 | 6/2009 | Gencyuz et al. | |
| 2010/0127847 A1 * | 5/2010 | Evans et al. | 340/461 |
| 2011/0175754 A1 * | 7/2011 | Karpinsky | 340/963 |
| 2011/0309924 A1 * | 12/2011 | Dybalski et al. | 340/438 |
| 2012/0041655 A1 * | 2/2012 | Thooris | 701/52 |
| 2012/0262403 A1 | 10/2012 | Tissot | |
| 2013/0097557 A1 * | 4/2013 | Madau et al. | 715/810 |

FOREIGN PATENT DOCUMENTS

| | | |
|---|---|---|
| CN | 2721447 Y | 8/2005 |
| CN | 102027269 A | 4/2011 |
| WO | 2007/021263 A1 | 2/2007 |

* cited by examiner

*Primary Examiner* — William Bashore
*Assistant Examiner* — Jeanette J Parker

(57) ABSTRACT

An on-screen gear selector for an automatic transmission, which provides an interface between the driver and the automatic transmission. The gear selector provides the current selection by the driver to the transmission control unit. The virtual on-screen gear selector provides safety and security features, and is incorporated into the software of the gear selector, such as not allowing the transmission to change from park until the brake pedal is depressed, or not allowing the transmission to change from drive to a lower gear or reverse if the speed of the vehicle is above a predetermined value, thereby avoiding damage to the transmission. The use of the on-screen gear selector also provides the benefit of reducing space and weight of the vehicle, by having less mechanical parts.

18 Claims, 2 Drawing Sheets

ON-SCREEN GEAR SELECTOR FOR AUTOMATIC TRANSMISSION

FIELD OF THE INVENTION

The present invention relates generally to an on screen gear selector for an automatic transmission.

BACKGROUND OF THE INVENTION

Manual gear selectors for automatic transmissions are generally known. These types of gear selectors typically incorporate the use of a knob or lever which is used to select the gear of operation from the transmission. The manual gear selector is used to change the transmission from "Park" to "Drive," or to "Reverse," one of the low gears, or neutral, as well as a combination of which. However, the components of a manual gear selector may wear out over extended periods of use, and may become stuck or broke.

Accordingly, there exists a need for a gear selector for an automatic transmission which reduces or eliminates the aforementioned problems.

SUMMARY OF THE INVENTION

The present invention is an on-screen gear selector for an automatic transmission, which provides an interface between the driver and the automatic transmission. The gear selector provides the current selection by the driver to the transmission control unit. The virtual on-screen gear selector provides security features, which are incorporated into the software of the gear selector, such as not allowing the transmission to change from Park until the brake pedal is depressed, or not allowing the transmission to change from drive to a lower gear or reverse if the speed of the vehicle is above a predetermined value, thereby avoiding damage to the transmission. The use of the on-screen gear selector also provides the benefit of reducing space and weight of the vehicle, by having less mechanical parts.

Another advantage of the present invention is that the operating mode of the transmission may be indicated on the screen while the vehicle is in use, providing the status as to which mode the transmission is operating in.

In an embodiment, the present invention is an on-screen gear selector for an automatic transmission. A touch screen is mounted as part of an instrument panel, and an on-screen gear selector is selectively displayed on the touch screen. The on-screen gear selector also includes a plurality of icons, each one of the plurality of icons representing a mode of operation of an automatic transmission. The plurality of icons are part of the on-screen gear selector, and an outline surrounds at least one of the icons to provide an indication of which mode of operation the automatic transmission is configured to operate. One of the icons is selected to configure the automatic transmission to operate in the corresponding mode of operation, and the outline surrounds the icon which is selected.

In one embodiment, the plurality of icons are arranged on the touch screen horizontally, but in other embodiments, the plurality of icons may be arranged in other ways, such as vertically, in rows, in columns, or combinations thereof.

In one embodiment, there are five icons, one of the plurality of icons provides an indication that the vehicle is in Park when surrounded by the outline, another of the plurality of icons provides an indication that the vehicle is in Drive when surrounded by the outline. Another of the plurality of icons provides an indication that the vehicle is in Reverse when surrounded by the outline, another of the plurality of icons provides an indication that the vehicle is in Neutral when surrounded by the outline, and another of the plurality of icons provides an indication that the vehicle is in manual Low gear when surrounded by the outline.

The on-screen gear selector may be incorporated with the safety features of the vehicle, such that the selector does not command the automatic transmission to shift one from gear to another when the vehicle is travelling above a predetermined speed.

Each of the plurality of icons and the outline are operable for being placed in a minimized position, allowing other functions of the touch screen to be used. One of the plurality of icons is displayed on the touch screen when in the minimized position, and the one icon being displayed is surrounded by the outline.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
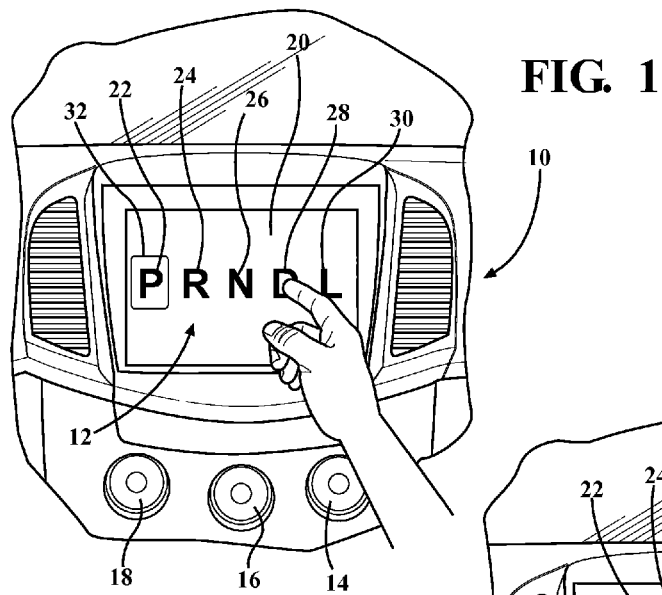
FIG. 1 is a perspective view of an on-screen gear selector, according to embodiments of the present invention.

The following description of the preferred embodiment(s) is merely exemplary in nature and is in no way intended to limit the invention, its application, or uses.

Referring now to the Figures generally, a portion of an instrument panel incorporating a gear selector function according to the present invention is shown generally at 10. The instrument panel 10 includes an on-screen gear selector according to the present invention, shown generally at 12, as well as other various vehicle control devices, such as a temperature control dial 14, a fan dial 16, and a vent control dial 18.

The gear selector 12 is part of a touch screen 20, where the touch screen 20 is also used to operate other vehicle functions, such as, but not limited to, GPS navigation, radio, compact disc player, mp3 player, parking assist system, and the like. The on-screen gear selector 12 provides an interface between the driver of the vehicle and the automatic transmission of the vehicle. In one embodiment, the selector 12 is in electronic communication with the electronic control unit (ECU) of the vehicle such that when the selector 12 is used to select a mode of operation, the ECU directs the transmission to change to the selected mode of operation.

Also, the on-screen gear selector 12 of the present invention is not limited for use with a specific type of transmission. The selector 12 of the present invention may be used with any type of transmission in which the various modes of operation may be changed to through the use of electronic control over the mechanical parts of the transmission, such that the vehicle's ECU may be linked to and control the transmission.

Figure 2:
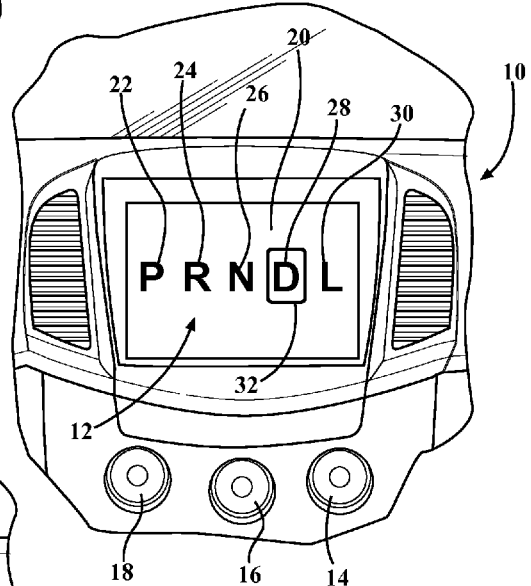
FIG. 2 is a perspective view of an on-screen gear selector, with the on-screen gear selector used to configure the transmission of the vehicle to operate in a drive mode of operation, according to embodiments of the present invention.

The selector 12 may be configured to operate in several ways. In one embodiment, upon starting or activation of the vehicle, the selector 12 is presented on the touch screen 20 as shown in FIG. 1. With reference to FIGS. 1-2, the various modes of operation the transmission is able to be configured are shown on the touch screen 20. More specifically, there is a group of icons indicating which mode of operation the transmission may be configured to. There is a first icon 22 representing the "Park" position (i.e. when the vehicle is in Park), a second icon 24 representing the "Reverse" mode of operation, a third icon 26 representing the "Neutral" mode of operation, a fourth icon 28 representing the "Drive" mode of operation, and a fifth icon 30 representing the "Low" mode of operation.

Upon initial activation of the vehicle, the icons 22,24,26, 28,30 are shown on the touch screen 20 as shown in FIG. 1. An indicator is used to identify the present mode of operation in which the transmission is configured. In this embodiment, the indicator is in the form of an outline 32, and the first icon 22 is surrounded by the outline 32 to provide an indication that the vehicle is in "Park." When the vehicle driver desires to drive the vehicle, the proper icon 22,24,26,28,30 is touched which corresponds to the desired mode of operation for the transmission. In the example shown in FIGS. 1-2, the fourth icon 28 on the touch screen 20 is touched to configure the transmission, and therefore the vehicle, in the drive mode of operation, or "Drive." When the vehicle is in Drive, the fourth icon 28 is surrounded by the outline 32, as shown in FIG. 2.

If the vehicle driver desires to place the transmission, and therefore the vehicle, in another mode of operation, one of the other icons 22,24,26,30 is touched, and the transmission is changed to be in the mode of operation chosen. If the driver desires the transmission, and therefore the vehicle, changed to be in the Reverse mode of operation, the second icon 24 is touched by the driver, and the transmission is changed to operate in the Reverse mode of operation. The outline 32 then surrounds the second icon 24. The same selection process is applied to the other respective modes of operation of the transmission. By touching the proper icon 22,24,26,28,30 which corresponds to the desired mode of operation of the transmission, the transmission is then configured to operate in the desired mode of operation. Also, the outline 20 is positioned to surround the icon 22,24,26,28,30 which represents the current mode of operation of the transmission.

Figure 3:
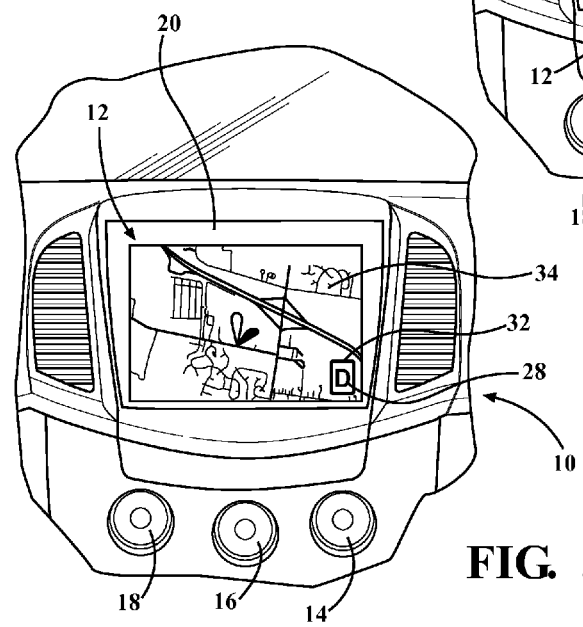
FIG. 3 is a perspective view of an on-screen gear selector, with one of the icons of the on-screen gear selector minimized to allow the vehicle to operate in a drive mode of operation and simultaneously use other vehicle functions, according to embodiments of the present invention.

In one embodiment, once the transmission is configured to the desired mode of operation, such as the Drive mode of operation as indicated by the fourth icon 28 shown in FIG. 2, the selector 12 is changed to a minimized view as shown in FIG. 3. The minimized view is useful when the vehicle, and hence the transmission, is going to be operating in a single mode of operation for extended periods of time (such as in the Drive mode of operation), rather than for a shorter amount of time, such as when the vehicle is configured to operate in the Reverse mode of operation. This allows for other functions to be displayed on the touch screen 20 with minimal interference from the selector 12. An example of this is shown in FIG. 3, where the display screen 34 of a navigation system is shown, and the fourth icon 28 and the outline 32 shown in a minimized position. In an embodiment of the present invention, the fourth icon 28 and outline 32 may change to the minimized position after a predetermined amount of driving time when the transmission is left in one particular mode of operation. Furthermore, while it is shown in FIG. 3 that the icon 28 and outline 32 may be located in the lower right-hand corner, it is within the scope of the invention that any of the icons 22,24,26,28,30 and outline 32 may be placed in one of the other corners of the touch screen 20, or any place else on the touch screen 20 in the minimized position to allow for use of other functions to be displayed on the touch screen 20.

When the touch screen 20 appears as shown in FIG. 3, and the icon 28 shown in the minimized position is touched, the touch screen 12 then changes to display the selector 12 as shown in FIG. 2, such that the transmission may be configured to operate in a different mode of operation. The gear selector 12 may also be configured to appear on the touch screen 20 when the vehicle comes to a complete stop, such as at an intersection, or entering a garage.

Figure 4:
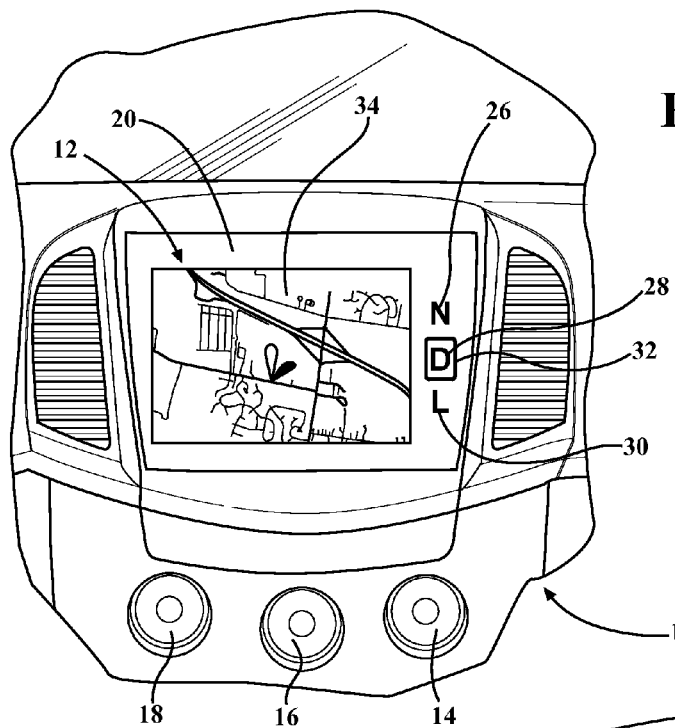
FIG. 4 is a perspective view of an on-screen gear selector, with several of the icons of the on-screen gear selector displayed in a pop-up mode of operation to allow the vehicle to operate in a drive mode, and providing the option to select other modes of operation, and simultaneously use other vehicle functions, according to embodiments of the present invention.

In an alternate embodiment, instead of touching the icon 28 when the icon 28 is in the minimized position as shown in FIG. 3 to change the display back to appear as shown in FIG. 2, the selector 12 may be configured to appear as shown in FIG. 4 when the vehicle begins to reduce speed, or when the vehicle has slowed down such that the vehicle speed is below a predetermined value. FIG. 4 shows a "pop-up" mode of operation of the selector 12, where several of the icons 26,28, 30 are shown next to the display screen 34 of the navigation system. It is also within the scope of the invention that the pop-up mode may be used with other functions being displayed on the touch screen 20. When the selector 12 is in pop-up mode, one of the icons 26,28,30 may be selected to change the mode of operation of the transmission, while the display screen 34 of the navigation system (or other function of the touch screen 20) is being displayed. The provides essentially a quick and efficient way to operate the selector 12 without having to configure the touch screen 20 to be shown as in FIGS. 1-2.

Figure 5:
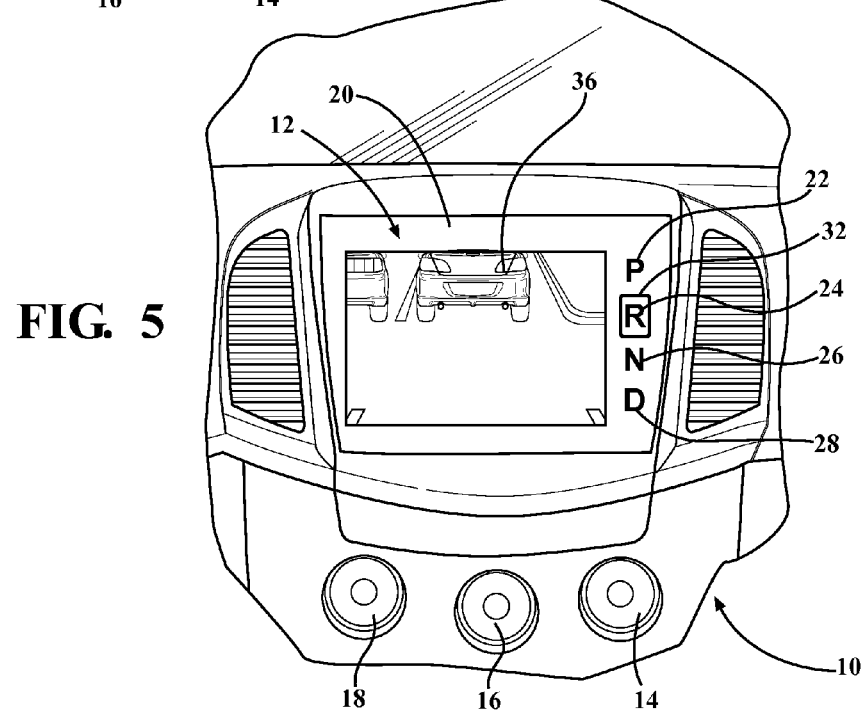
FIG. 5 is a second perspective view of an on-screen gear selector, with several of the icons of the on-screen gear selector displayed in a pop-up mode of operation to allow the vehicle to operate in a reverse mode, and providing the option to select other modes of operation, and simultaneously use other vehicle functions, according to embodiments of the present invention.

Another function of the pop-up mode is shown in FIG. 5, where several of the icons 22,24,26,28 are displayed next to a park assist screen 36. The park assist screen 36 is displayed on the touch screen 20 when the transmission is in the Reverse mode of operation, and the outline 32 surrounds the second icon 24. Typically, a vehicle is driven in the Reverse mode of operation for short distances, and allowing the icons 22,24, 26,28 to be displayed in the pop-up mode as shown in FIG. 5 allows the selector 12 to be operated without having to revert back to the view shown in FIG. 1 or 2. These icons 22,24,26, 28 may also be displayed when the other functions are displayed on the touch screen 20 as well. Additionally more of less of the icons 22,24,26,28,30, as well as different combinations of the icons 22,24,26,28,30 may be displayed on the touch screen 20 when other functions are displayed on the touch screen 20.

In an embodiment, the selector 12 is also configured to appear as shown in FIG. 2 when the vehicle comes to a stop, such as at an intersection or when parking in a parking lot or garage, to allow the driver of the vehicle to access the selector 12 and change the mode of operation of the transmission if need be, when frequent mode of operation change is a common occurrence.

The on-screen gear selector 12 also includes several safety and security features. One of these features is that the driver of the vehicle is not able to change the mode of operation of the transmission from the Park position unless the brake pedal is depressed. More specifically, when the on-screen gear selector 12 is configured as shown in FIG. 1, and is in the Park position, as noted by the outline 32 surrounding the first icon 22, the selector 12 cannot be used to change the transmission from the Park position unless the brake pedal is pressed. Furthermore, if the selector 12 is configured as shown in FIG. 2, such that the vehicle is in the Drive gear, and the outline 32 surrounds the fourth icon 28, the driver, even if one of the other icons 22,24,26,30 is touched, is not able to change the mode of operation of the transmission unless the vehicle is travelling below a predetermined speed. Similarly, if the selector is configured to be in the Reverse gear, and the outline 32 surrounds the second icon 24, the driver, even if one of the other icons 22,26,28,30 is touched, is not able to change the mode of operation of the transmission unless the vehicle is travelling below a certain speed. In other embodiments, the selector 12 and transmission may be configured to disallow changing between modes of operation unless the vehicle is travelling below a certain speed, regardless of what mode of operation the vehicle and transmission are in, and which icon 22,24,26,28,30 is surrounded by the outline 32.

It should be noted that the arrangement of the icons 22, 24,26,28,30 is not limited to what is shown in FIGS. 1-4. It is within the scope of the invention that the icons 22,24,26,28, 30 may be arranged differently than what is shown on the touch screen 20. For example, the icons 22,24,26,28,30 may be arranged horizontally, diagonally, in one or more rows or columns, and combinations thereof.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus comprising:
    an on-screen gear selector for an automatic transmission of a vehicle, including:
    a touch screen;
    an on-screen gear selector for selectively being displayed on the touch screen, the on-screen gear selector having a minimized position and a pop-up mode; and
    a plurality of icons,
    each of the plurality of icons representing a mode of operation of the automatic transmission,
    the plurality of icons selectively displayed on the touch screen,
    the plurality of icons being part of the on-screen gear selector;
    wherein each of the plurality of icons is touched to configure the transmission to operate in a mode of operation represented by the touched icon, and
        only the icon representing a current mode of operation is displayed on the touch screen when the on-screen gear selector is in the minimized position, and
        when the on-screen gear selector is in the minimized position,
            the displayed icon representing the current mode of operation is touched to configure the touch screen such that all of the plurality of icons are displayed on the touch screen; and
    wherein the on-screen gear selector is placed in the minimized position after a predetermined amount of driving time in the mode of operation represented by the displayed icon, allowing other functions to be displayed on the touch screen; and
    wherein the on-screen gear selector chances from the minimized position to pop-up mode when the speed of the vehicle is below a predetermined value.

2. The apparatus of claim 1, wherein,
    one of the plurality of icons providing an indication that the vehicle is in park,
    another of the plurality of icons providing an indication that the vehicle is in drive,
    another of the plurality of icons providing an indication that the vehicle is in reverse,
    another of the plurality of icons providing an indication that the vehicle is in neutral, and
    another of the plurality of icons providing an indication that the vehicle is in manual low gear.

3. The apparatus of claim 2, wherein the plurality of icons are arranged horizontally.

4. The apparatus of claim 1, further comprising an indicator used with the plurality icons for providing an indication of which mode of operation the automatic transmission is configured.

5. The apparatus of claim 4, the indicator further comprising an outline substantially surrounding the touched icon.

6. The apparatus of claim 1,
    wherein when the on-screen gear selector is placed in the minimized position,
    the shown icon representing the current mode of operation is surrounded by the outline.

7. The apparatus of claim 1,
    wherein the on-screen gear selector prohibits the automatic transmission to shift one from gear to another when the vehicle is travelling above a predetermined speed.

8. The apparatus of claim 1, further comprising an instrument panel, the touch screen being part of the instrument panel.

9. An on-screen gear selector for an automatic transmission of a vehicle, comprising:
    a touch screen;
    an on-screen gear selector for selectively being displayed on the touch screen the on-screen gear selector having a minimized position and a pop-up mode; and
    a plurality of icons selectively displayed on the touch screen, each of the plurality of icons being part of the on-screen gear selector; and
    an indicator used on one of the plurality of icons, the indicator displayed on the touch screen in proximity to one of the plurality of icons;
    wherein each of the plurality of icons represents a mode of operation of the automatic transmission, and
    wherein each of the plurality of icons is touched to configure the transmission to operate in a mode of operation represented by the touched icon, and
        only the icon representing the current mode of operation displayed on the touch screen when the on-screen gear selector is in the minimized position, and
        when the on-screen gear selector is in the minimized position,
            the displayed icon representing the current mode of operation is touched to configure the touch screen such that all of the one or more plurality of icons are displayed on the touch screen; and
    wherein the on-screen gear selector is placed in the minimized position after a predetermined amount of driving time in the mode of operation represented by the displayed icon, allowing other functions to be displayed on the touch screen; and wherein the on-screen gear selector changes from the minimized position to pop-up mode when the speed of the vehicle is below a predetermined value.

10. The on-screen gear selector for an automatic transmission of a vehicle of claim 9, wherein the plurality of icons are arranged horizontally when displayed on the touch screen.

11. The on-screen gear selector for an automatic transmission of a vehicle of claim 9, the indicator further comprising an outline substantially surrounding the icon representing the current mode of operation.

12. The on-screen gear selector for an automatic transmission of a vehicle of claim 9,
one of the plurality of icons providing an indication that the vehicle is in park when displayed with the indicator,
another of the plurality of icons providing an indication that the vehicle is in drive when displayed with the indicator,
another of the plurality of icons providing an indication that the vehicle is in reverse when displayed with the indicator,
another of the plurality of icons providing an indication that the vehicle is in neutral when displayed with the indicator, and
another of the plurality of icons providing an indication that the vehicle is in manual low gear when displayed with the indicator.

13. The on-screen gear selector for an automatic transmission of a vehicle claim 9, further comprising an instrument panel, the touch screen being part of the instrument panel.

14. The on-screen gear selector for an automatic transmission of a vehicle of claim 9, wherein the on-screen gear selector prohibits the automatic transmission to shift one from gear to another when the vehicle is travelling above a predetermined speed.

15. An on-screen gear selector for an automatic transmission, comprising:
an instrument panel;
a touch screen mounted as part of the instrument panel;
an on-screen gear selector for selectively being displayed on the touch screen;
a plurality of icons, each one of the plurality of icons representing a mode of operation of an automatic transmission,
the plurality of icons being part of the on-screen gear selector; and
an outline surrounding at least one of the plurality of icons, the outline providing an indication in which mode of operation the automatic transmission is configured to operate;
wherein one of the plurality of icons is selected by a touch on the touch screen to configure the automatic transmission to operate in the corresponding mode of operation, and the outline surrounds the icon which is selected, and
wherein each of the plurality of icons is touched to configure the transmission to operate in a mode of operation and
only the icon representing a current mode of operation is displayed on the touch screen when the on-screen gear selector is in the minimized position, and
when the on-screen gear selector is in the minimized position,
the displayed icon representing the current mode of operation is touched to configure the touch screen such that all of the plurality of icons are displayed on the touch screen; and
wherein the on-screen gear selector is placed in the minimized position after a predetermined amount of driving time in the mode of operation represented by the displayed icon, allowing other functions to be displayed on the touch screen; and
wherein the on-screen gear selector changes from the minimized position to pop-up mode when the speed of the vehicle is below a predetermined value.

16. The on-screen gear selector for an automatic transmission of a vehicle of claim 15, wherein the plurality of icons are arranged on the touch screen horizontally.

17. The on-screen gear selector for an automatic transmission of a vehicle of claim 15,
one of the plurality of icons providing an indication that the vehicle is in park when surrounded by the outline,
another of the plurality of icons providing an indication that the vehicle is in drive when surrounded by the outline,
another of the plurality of icons providing an indication that the vehicle is in reverse when surrounded by the outline,
another of the plurality of icons providing an indication that the vehicle is in neutral when surrounded by the outline, and
another of the plurality of icons providing an indication that the vehicle is in manual low gear when surrounded by the outline.

18. The on-screen gear selector for an automatic transmission of a vehicle of claim 15, wherein the on-screen gear selector prohibits the automatic transmission to shift one from gear to another when the vehicle is travelling above a predetermined speed.

* * * * *